United States Patent
Moore et al.

(10) Patent No.: US 10,189,506 B2
(45) Date of Patent: Jan. 29, 2019

(54) ROOF SENSOR HOUSING ASSEMBLIES THAT CONCEAL ONE OR MORE SENSORS AND VEHICLES INCORPORATING THE SAME

(71) Applicant: Toyota Motor Engineering & Manufacturing North America, Inc., Erlanger, KY (US)

(72) Inventors: Jaime N. Moore, Ann Arbor, MI (US); Crystal J. Mink, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 177 days.

(21) Appl. No.: 15/231,040

(22) Filed: Aug. 8, 2016

(65) Prior Publication Data
US 2018/0037268 A1 Feb. 8, 2018

(51) Int. Cl.
*B62D 25/06* (2006.01)
*G01S 13/93* (2006.01)

(52) U.S. Cl.
CPC ............ *B62D 25/06* (2013.01); *G01S 13/931* (2013.01); *G01S 2013/9382* (2013.01)

(58) Field of Classification Search
CPC ...................................................... B62D 25/06
USPC .............. 296/187.13, 193.12, 1.08, 215, 210
See application file for complete search history.

(56) References Cited

U.S. PATENT DOCUMENTS

| | | | | |
|---|---|---|---|---|
| 4,141,425 A | * | 2/1979 | Treat ...................... | B60K 16/00 136/291 |
| 4,592,436 A | * | 6/1986 | Tomei ..................... | B60L 8/003 136/245 |
| 5,228,925 A | * | 7/1993 | Nath ...................... | H01L 31/048 136/251 |
| 5,545,261 A | * | 8/1996 | Ganz ......................... | B60J 7/00 136/251 |
| 7,259,669 B2 | | 8/2007 | Ewerhard | |

(Continued)

FOREIGN PATENT DOCUMENTS

DE 10202023577 6/2014
WO 20070131491 11/2007

*Primary Examiner* — Jason S Morrow
*Assistant Examiner* — E Turner Hicks
(74) *Attorney, Agent, or Firm* — Dinsmore & Shohl LLP

(57) ABSTRACT

A vehicle includes a roof assembly including a roof outer panel having an outer facing surface and a sensor housing recess that extends below the outer facing surface. The sensor housing recess extends in a vehicle longitudinal direction between a front windshield and a rear windshield. A roof sensor housing assembly is mounted to the roof outer panel and extends along a length of the sensor housing recess. The roof sensor housing assembly includes a sensor housing structure that is mounted to the roof outer panel forming a sensor housing volume therebetween. The sensor housing structure extends at least partially above the outer facing surface of the outer roof panel. The sensor housing structure includes a transmission region that has increased transmittance therethrough compared to surrounding regions of the sensor housing structure. A vehicle sensor is located within the sensor housing volume that receives electromagnetic energy through the transmission region and provides a signal that is indicative of an environmental characteristic.

20 Claims, 7 Drawing Sheets

(56) References Cited

U.S. PATENT DOCUMENTS

| | | | |
|---|---|---|---|
| 7,445,275 B2 * | 11/2008 | Woodhouse | B60L 8/00 136/251 |
| 8,810,382 B1 | 8/2014 | Laurita | |
| 2004/0183661 A1 | 9/2004 | Bowman | |
| 2008/0238643 A1 | 10/2008 | Malen | |
| 2009/0000960 A1 | 1/2009 | Kanaoka et al. | |
| 2013/0135880 A1 | 5/2013 | Michie et al. | |
| 2015/0180178 A1 | 6/2015 | Ranka et al. | |

* cited by examiner

ROOF SENSOR HOUSING ASSEMBLIES THAT CONCEAL ONE OR MORE SENSORS AND VEHICLES INCORPORATING THE SAME

TECHNICAL FIELD

The present specification generally relates to vehicle roof assemblies and, more specifically, to vehicles and roof sensor housing assemblies for concealing one or more vehicle sensors.

BACKGROUND

Vehicles on the road today use a variety of sensors to detect different aspects of an environment. These sensors may then communicate this detected information about the environment to the driver or cause the vehicle to react in some way (e.g. a rain sensor that causes the windshield wipers to swipe across the windshield). Such sensors may need to be placed in a variety of locations on the vehicle. In many instances, it may be desirable to place certain sensors near a roof of the vehicle. However, because of the size or awkwardness of some sensor apparatuses, placing a sensor apparatus on the roof of the vehicle may be less visually appealing to consumers.

Accordingly, a need exists for alternative roof structures to conceal vehicle sensors to preserve the visual appeal of the vehicle while not unduly affecting the performance of the sensors.

SUMMARY

In one embodiment, a vehicle includes a roof assembly including a roof outer panel having an outer facing surface and a sensor housing recess that extends below the outer facing surface. The sensor housing recess extends in a vehicle longitudinal direction between a front windshield and a rear windshield. A roof sensor housing assembly is mounted to the roof outer panel and extends along a length of the sensor housing recess. The roof sensor housing assembly includes a sensor housing structure that is mounted to the roof outer panel forming a sensor housing volume therebetween. The sensor housing structure extends at least partially above the outer facing surface of the outer roof panel. The sensor housing structure includes a transmission region that has increased transmittance therethrough compared to surrounding regions of the sensor housing structure. A vehicle sensor is located within the sensor housing volume that receives electromagnetic energy through the transmission region and provides a signal that is indicative of an environmental characteristic.

In another embodiment, a roof sensor housing assembly to mount to a roof outer panel of a vehicle includes a bracket mounting structure that mounts to the roof outer panel. A sensor housing structure is mounted to the bracket mounting structure forming a sensor housing volume therebetween. The sensor housing structure includes a transmission region having increased transmittance therethrough compared to surrounding regions of the sensor housing structure. A vehicle sensor is located within the sensor housing volume that receives electromagnetic energy through the transmission region and provides a signal that is indicative of an environmental characteristic. The sensor housing structure has a length that is at least about three times a width of the sensor housing structure to provide a visual indication of a racing stripe.

In yet another embodiment, a vehicle includes a roof assembly including a roof outer panel that has an outer facing surface and a first sensor housing recess that extends below the outer facing surface. The first sensor housing recess extends in a vehicle longitudinal direction between a front windshield and a rear windshield. The roof panel has a second sensor housing recess that extends below the outer facing surface. The second sensor housing recess extends in the vehicle longitudinal direction between the front windshield and the rear windshield. A first roof sensor housing assembly is mounted to the roof outer panel and extends along a length of the first sensor housing recess in an elongated fashion. The first roof sensor housing assembly has a length that is greater than a width of the first roof sensor housing assembly to provide a visual indication of a first racing stripe. A second roof sensor housing assembly is mounted to the roof outer panel and extends along a length of the second sensor housing recess in an elongated fashion. The second roof sensor housing assembly has a length that is greater than a width of the second roof sensor housing assembly to provide a visual indication of a second racing stripe.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles and roof sensor housing assemblies for concealing one or more vehicle sensors. The vehicles may include a roof assembly that includes an outer roof panel. The outer roof panel may extend to vehicle windshields located at a front and rear of the vehicle. The outer roof panel may also extend side-to-side to side rails located at opposite sides of the vehicle. The roof sensor housing assemblies include a sensor housing structure that is located on the outer roof panel and located between the side rails. The sensor housing structure may be connected to a bracket mounting structure that coextends with the sensor housing structure along a length of the outer roof panel. The sensor housing structure and the bracket mounting structure may form a closed cavity or volume therebetween that houses one or more vehicle sensors. In some embodiments, the sensor housing structure may include one or more transmission regions that allow increased transmission of electromagnetic energy (e.g., light) therethrough that is used by the vehicle sensor to generate an output. For example, the one or more vehicle sensors may provide a signal that is indicative of an environmental characteristic. One or more processors may be communicatively coupled to the one or more sensors to cause the vehicle to respond to the signal received from the one or more sensors that is indicative of the environmental characteristic.

Figure 1:
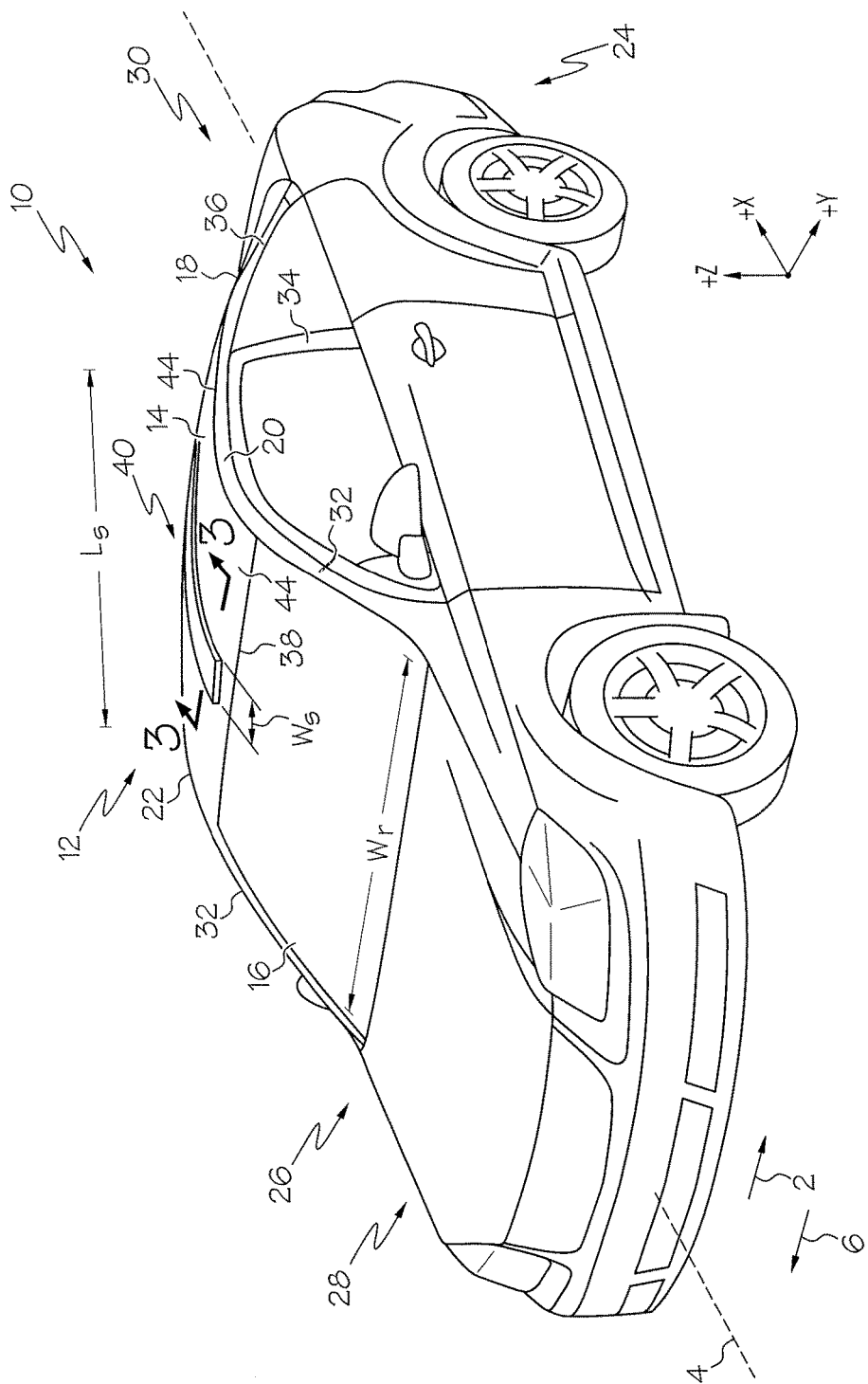
FIG. 1 depicts a perspective view of a vehicle including a roof sensor housing assembly that conceals a vehicle sensor, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Referring to FIG. 1, the vehicle 10 includes a roof assembly 12 that includes an outer roof panel 14 that extends between a front windshield 16 at a front 28 of the vehicle 10 and a rear windshield 18 at a rear 30 of the vehicle 10 in the vehicle longitudinal direction. The outer roof panel 14 also extends between side rails 20 and 22 at opposite sides 24 and 26 of the vehicle 10 in the vehicle lateral direction. The vehicle 10 further includes support pillars (e.g., A pillar 32, B pillar 34 and C pillar 36) that support the roof assembly 12 at a top of the vehicle 10. In other embodiments, additional pillars (e.g., a D pillar and E pillar) may be provided, for example, for other vehicle types, such as SUVs, vans, buses, etc. The front windshield 16 extends laterally between the support pillars 32 and longitudinally toward the rear 30 of the vehicle 10 to provide an angled side profile from front-to-rear of the vehicle 10. A roofline 38 may be provided where the front windshield 16 appears to transition to the outer roof panel 14; although, the front windshield 16 may continue beyond the roofline 38 in the vehicle vertical and longitudinal directions.

Figure 2:
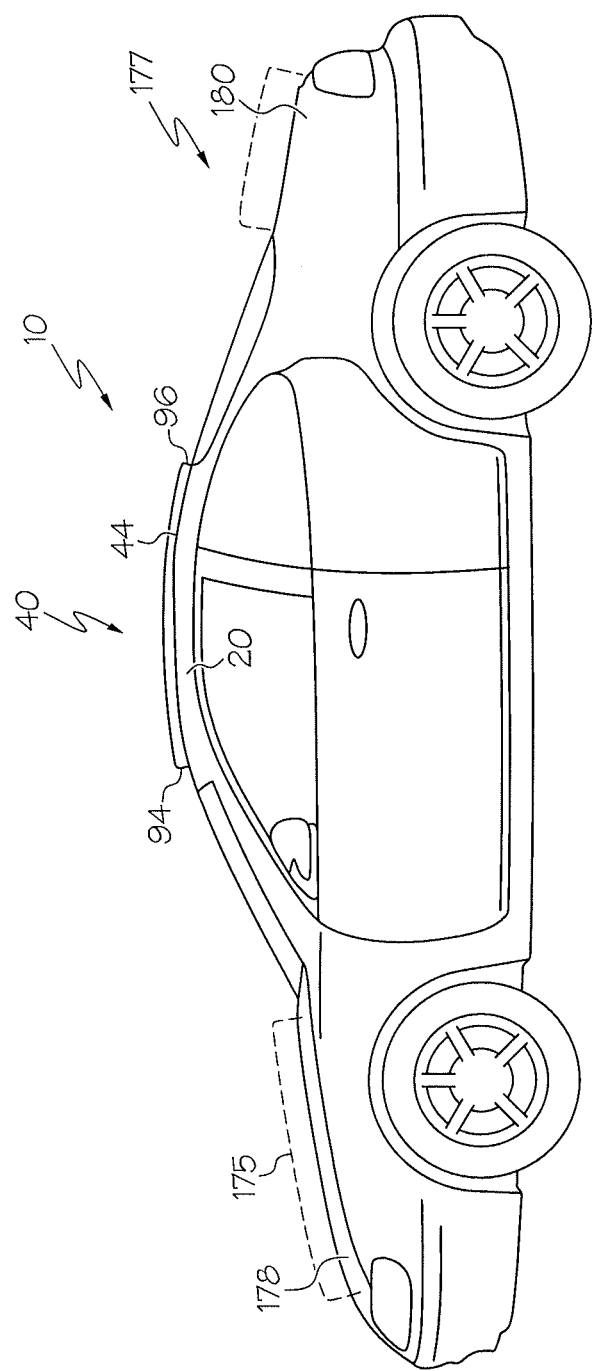
FIG. 2 depicts a side view of the vehicle of FIG. 1, according to one or more embodiments shown and described herein.

Referring also to FIG. 2, the vehicle 10 includes a roof sensor housing assembly 40. While a single roof sensor housing assembly 40 is illustrated by FIG. 1, there may be more than one sensor housing assemblies as will be described below. The roof sensor housing assembly 40 is located between opposite side rails 20 and 22, extending generally parallel thereto. The roof sensor housing assembly 40 extends in the vehicle longitudinal direction along the length of the outer roof panel 14, seemingly following the contour of an outer facing surface 44 of the outer roof panel 14 in the vehicle longitudinal direction. In some embodiments, the roof sensor housing assembly 40 can extend to visually resemble a racing stripe, depending, for example, on the selected dimensions of the roof sensor housing assembly 40 in the vehicle vertical, longitudinal and lateral directions. Such an arrangement can disguise the roof sensor housing assembly 40 by providing an indication to a viewer of another structural type.

As shown more clearly in FIG. 1, the roof sensor housing assembly 40 may have a substantially constant and/or varying width in the vehicle lateral direction and may be relatively thin as compared to a maximum width Wr of the outer roof panel 14 in the vehicle lateral direction. For example, a maximum width Ws of the roof sensor housing assembly 40 may be no greater than about 50 percent of the width Wr of the outer roof panel 14, such as no greater than about 35 percent, such as no greater than about 25 percent, such as no greater than about 15 percent. Additionally, a length Ls of the roof sensor housing assembly 40 in the vehicle longitudinal direction may be greater than the width Ws. For example, a maximum length Ls of the roof sensor housing assembly 40 may be at least about 2 times, such as at least about 3 times, such as at least about 5 times the maximum width Ws.

Figure 3:
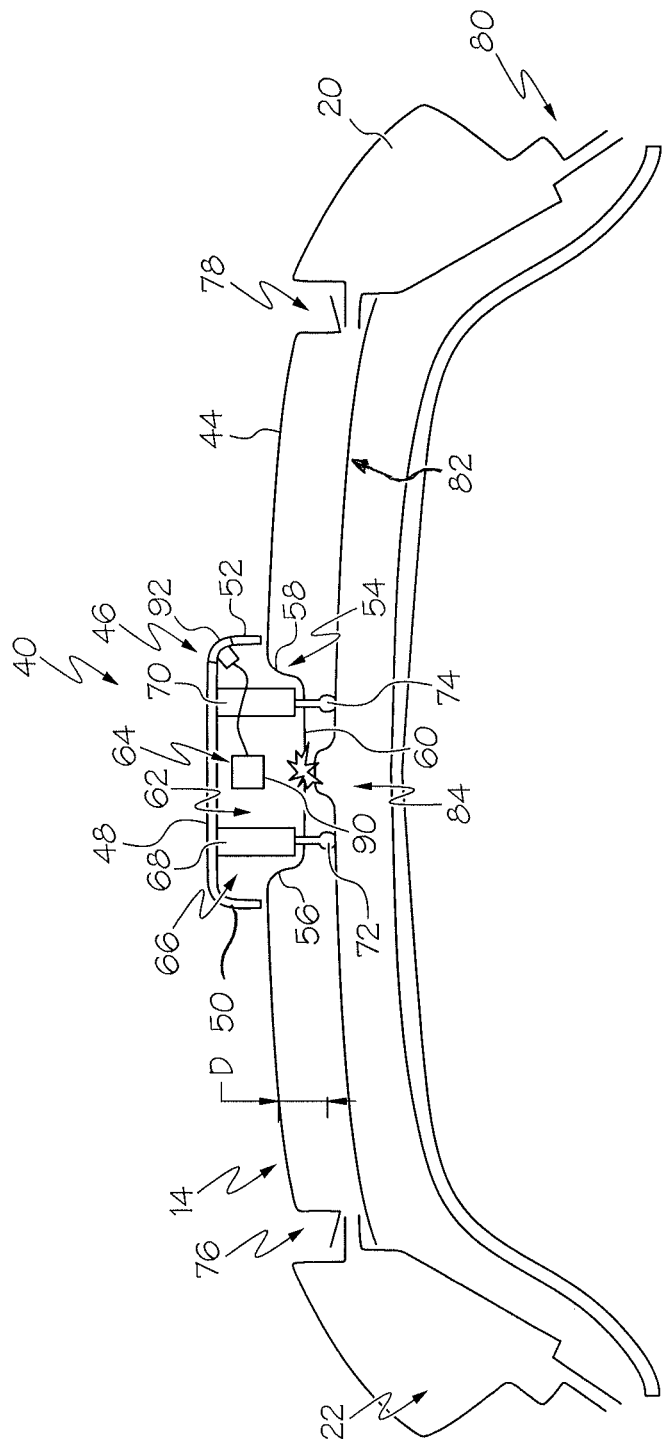
FIG. 3 is a diagrammatic section view of the roof sensor housing assembly along line 3-3 of FIG. 1, according to one or more embodiments shown and described herein.

Referring to FIG. 3, the roof sensor housing assembly 40 includes a sensor housing structure 46 that forms the appearance of the racing stripe. In this example, the sensor housing structure 46 includes a top portion 48 and side portions 50 and 52 that extend downwardly from the top portion 48 toward the outer facing surface 44 of the outer roof panel 14 defining a somewhat inverted U-shape. The sensor housing structure 46 defines a cover that extends over a sensor housing recess 54 formed by the outer roof panel 14. The sensor housing recess 54 may be formed integrally by the outer roof panel 14 and includes inwardly extending wall portions 56 and 58 and a floor portion 60 that is located below the outer facing surface 44. The top portion 48 of the sensor housing structure 46 is located directly over the floor portion 60 of the sensor housing recess 54 thereby forming a sensor housing volume 62 therebetween. The floor portion 60 of the sensor housing recess 54 may be located a distance D below the outer facing surface 44 to provide the sensor housing volume 62 of sufficient dimensions to house a vehicle sensor assembly 64 with the sensor housing structure 46 appearing flush against the outer facing surface 44 of the outer roof panel 14.

The sensor housing structure 46 may be connected to the outer roof panel 14 by a clip assembly 66. The clip assembly 66 may include a first clip portion 68 and a second clip portion 70. The first and second clip portions 68 and 70 may be connected directly to the outer roof panel 14 using connectors 72 and 74. The outer roof panel 14 may be connected to each side rail 20 and 22 at connecting locations 76 and 78 (e.g., by welding). The outer roof panel 14 may further be connected to the vehicle frame 80 at a roof cross bar 82. The roof cross bar 82 may extend between the side rails 20 and 22 in the vehicle lateral direction. The outer roof panel 14 may be connected to the roof cross bar 82 at a connecting location 84 (e.g., by a weld, mastic and/or any other suitable connection).

One or more vehicle sensors 90 are located in the sensor housing volume 62. The one or more vehicle sensors 90 may include a variety of sensors 90. For instance, the one or more vehicle sensors 90 may be at least one or more of LiDAR, vehicle-to-vehicle communication, camera, radar, and laser. These one or more vehicle sensors 90 may provide a variety of environmental information to the vehicle 10 to allow the vehicle 10 to react in response to a signal provided by the one or more vehicle sensors 90. Examples are described in more detail below.

A transmission region 92 (e.g., a window, lens, etc.) may be provided in the sensor housing structure 46. The transmission region 92 may be formed of any suitable material (e.g., glass, plastic, etc.) that allows for increased and/or directed transmission of electromagnetic energy (e.g., visible, ultraviolet infrared or near infrared light) therethrough compared to surrounding regions. For example, the sensor housing structure 46 may be coated with a black color coating, which can impede light transmission therethrough. The transmission region 92 may be transparent or semi-transparent to facilitate transmission of light into the sensor housing volume 62. In some embodiments, multiple transmission regions 92 may be provided along the width and/or length, along either top portion 48, side portions 50 and 52, front 94 and rear 96 (FIG. 2) of the sensor housing structure 46. In some embodiments, the transmission region 92 may span multiple ones of the vehicle sensors 90 as a continuous transmission region structure. Further, the transmission region 92 may be provided by a separate component and attached to the sensor housing structure 46 or the transmission region 92 may be provided by the sensor housing structure 46 itself (e.g., using an uncoated region) depending on the type of material forming the sensor housing structure 46.

Transmittance refers to the percentage of radiation that can pass through the transmission region 92 and the surrounding regions. Transmittance can be defined for different types of light or energy, such as visible, UV transmittance, etc. Material properties of the transmission region 92 can be selected, and coatings can be used to increase transmission of certain types of energy, while decreasing transmission of other types of energy, such as heat. Transmittance through the transmission region 92 and surrounding regions (e.g., see adjacent regions 100 and 102) of the sensor housing structure 46 can be determined by measuring the intensities of incident and transmitted light through the regions 92, 100 and 102.

Figure 4:
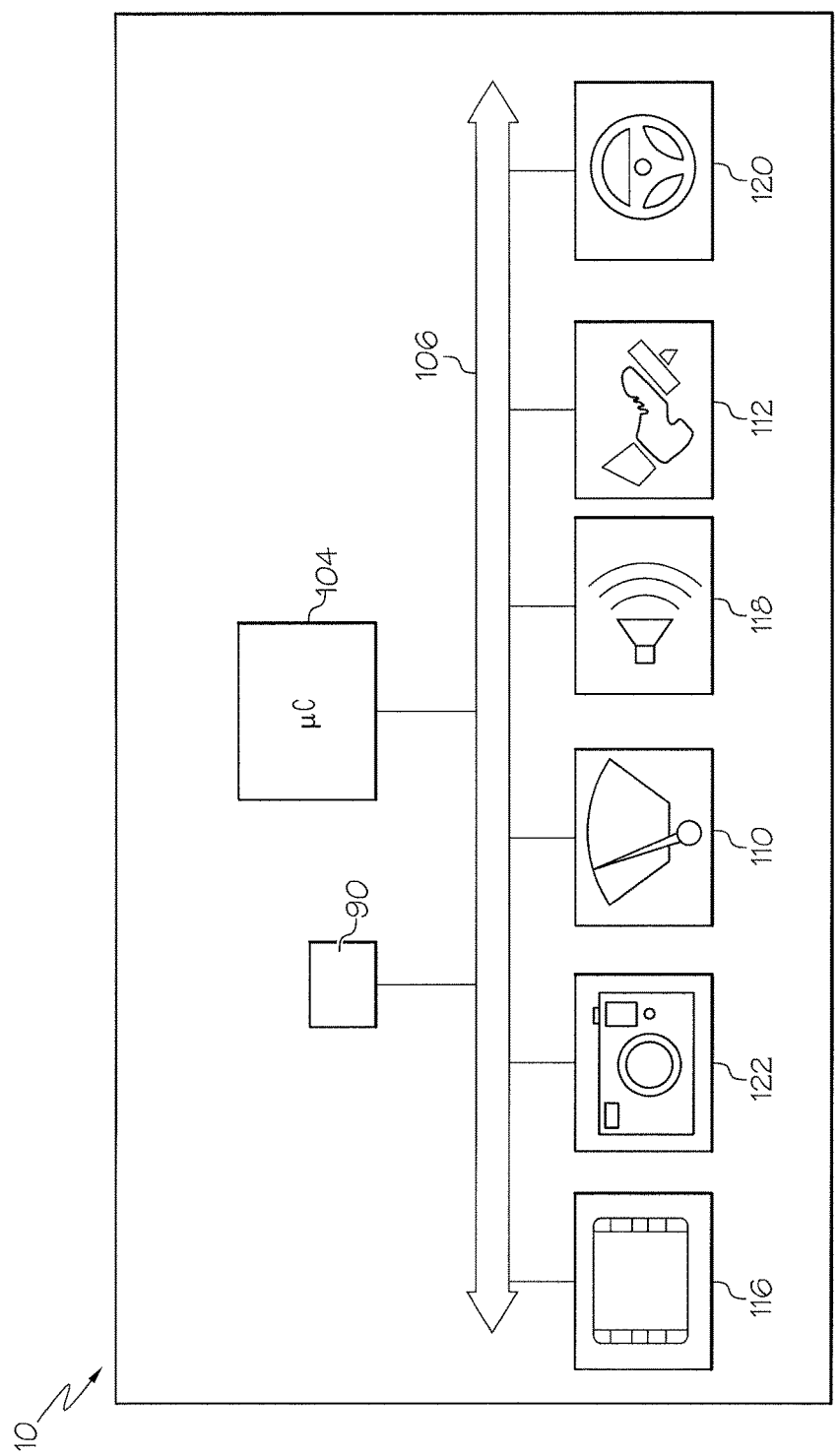
FIG. 4 schematically depicts a vehicle sensing system of the vehicle of FIG. 1 including a processor communicatively coupled to sensors, according to one or more embodiments shown and described herein.

Referring to FIG. 4, the vehicle sensor 90 is configured to produce a signal indicative of a characteristic of an environment of the vehicle 10 detected by the vehicle sensor 90 through the transmission region 92. The signal produced by the vehicle sensor 90 may be communicatively coupled to different vehicle components to cause the vehicle 10 to respond to the signal. For example, the vehicle 10 may include one or more processors 104 communicatively coupled to the vehicle sensor 90 as shown by FIG. 4. The processor 104 may include any device capable of executing machine-readable instructions stored on a non-transitory computer-readable medium. Accordingly, the processor 104 may include a controller, an integrated circuit, a microchip, a computer, and/or any other computing device. The processor 104 is coupled to a communication path 106 that provides signal interconnectivity between various components of the vehicle 10. Specifically, the communication path 106 provides signal interconnectivity between the processor 104, the vehicle sensor 90, and various modules of the vehicle 10. As used herein, the term "communicatively coupled" means that coupled components are capable of exchanging data signals with one another such as, for example, electrical signals via conductive medium, electromagnetic signals via air, optical signals via optical waveguides, and the like.

The communication path 106 may be formed from any medium that is capable of transmitting a signal such as, for example, conductive wires, conductive traces, optical waveguides, or the like. In some embodiments, the communication path 106 may facilitate the transmission of wireless signals, such as WiFi, Bluetooth, and the like. Moreover, the communication path 106 may be formed from a combination of mediums capable of transmitting signals. In one embodiment, the communication path 106 comprises a combination of conductive traces, conductive wires, connectors, and buses that cooperate to permit the transmission of electrical data signals to components such as processors 104, memories, sensors, input devices, output devices, and communication devices. Accordingly, the communication path 106 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Embodiments may include logic that includes machine-readable instructions and/or an algorithm written in any programming language of any generation (e.g., 1GL, 2GL, 3GL, 4GL, and/or 5GL) such as, e.g., machine language that may be directly executed by the processor 104, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As described above, the vehicle sensor 90 may be communicatively coupled to the processor 104 over the communication path 106. As described above, the vehicle sensor 90 may be operable to sense one or more characteristics of an environment of the vehicle 10. In general, the vehicle sensor 90 may sense characteristics of the environment including, but not limited to, rain, navigational information, oncoming obstacles, potentially hazardous obstacles, and other vehicles. Based on information detected by the vehicle sensor 90, the processor 104 may execute machine readable instructions to cause the vehicle 10 to respond to the characteristic detected by the vehicle sensor 90.

FIG. 4 illustrates a variety of non-limiting examples in which the processor 104 may use the information from the vehicle sensor 90. For instance, if the vehicle sensor 90 detects rain, the processor 104 may execute logic to cause windshield wipers 110 to turn on to wipe rain droplets from the front and/or rear windshields 16, 18. In another example, the vehicle sensor 90 may detect that an obstacle has entered an anticipated path of the vehicle 10, such as, for example, a pedestrian stepping in front of the path of the vehicle 10. In that case, the processor 104 may execute logic to apply brakes 112 of the vehicle 10 or, in some cases; the processor 104 may execute logic to display a warning on one or more displays 116 of the vehicle 10. In some cases, the environmental characteristic sensed by the vehicle sensor 90 may cause the processor 104 to execute machine readable instructions to cause an audible warning be emitted by a speaker 118 of the vehicle 10. In yet another non-limiting example, the vehicle 10 is an autonomous vehicle and the vehicle sensor 90 may be a LiDAR sensor that scans the environment. In that case, the processor 104 can execute machine readable instructions to navigate the vehicle 10 autonomously 120. Further, the signal from the vehicle sensor 90 may be used to activate other sensors such as a video camera 122 to acquire an image.

Figure 5:
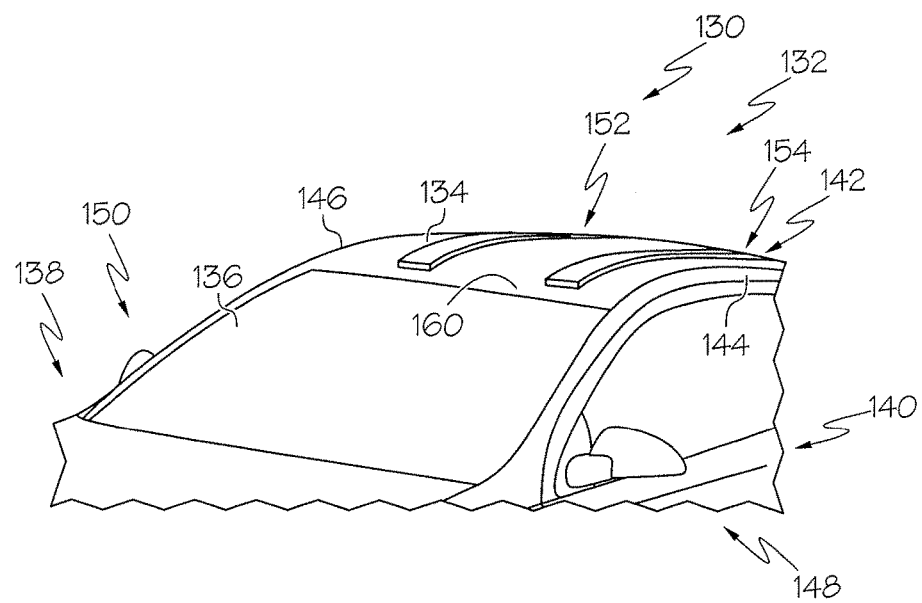
FIG. 5 illustrates a vehicle including another embodiment of a roof sensor housing assembly that conceals a vehicle sensor, according to one or more embodiments shown and described herein.
Figure 6:
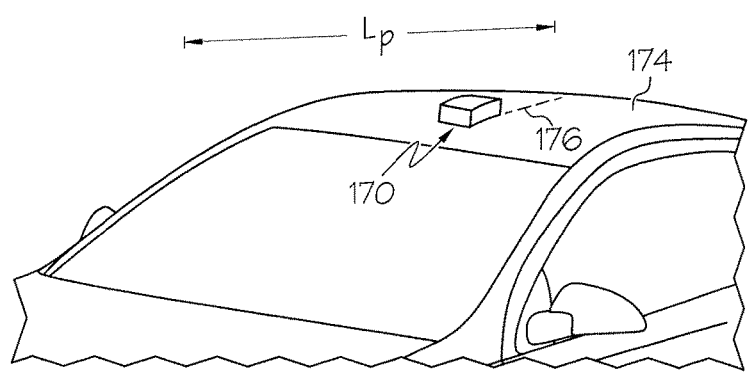
FIG. 6 illustrates a vehicle including another embodiment of a roof sensor housing assembly that conceals a vehicle sensor, according to one or more embodiments shown and described herein.

FIGS. 5 and 6 illustrate other embodiments of roof sensor housing assemblies. As indicated above, the roof sensor housing assemblies may have a variety of shapes and sizes depending on a desired visual effect. Referring first to FIG. 5, as with the vehicle 10, a vehicle 130 includes a roof assembly 132 that includes an outer roof panel 134 that extends between a front windshield 136 at a front 138 of the vehicle 130 and a rear windshield 140 at a rear 142 of the vehicle 130 in the vehicle longitudinal direction. The outer roof panel 134 also extends between side rails 144 and 146 at opposite sides 148 and 150 of the vehicle 130 in the vehicle lateral direction. In this embodiment, a pair of roof sensor housing assemblies 152 and 154 are provided that extend in the vehicle longitudinal direction along the length of the outer roof panel 134, following the contour of an outer facing surface 160 of the outer roof panel 134 in the vehicle longitudinal direction. The roof sensor housing assemblies 152 and 154 may include any one or more of the components of the roof sensor housing assembly 40.

Illustrated in FIG. 6 is another embodiment of a roof sensor housing assembly 170 that extends in the vehicle longitudinal direction for only a limited amount of distance. For example, the roof sensor housing assembly 170 may extend 100 percent a total length Lp of an outer roof panel 174 the vehicle longitudinal direction, such as less than about 90 percent of the total length Lp, such as less than about 75 percent of a total length Lp, such as less than about 50 percent of the total length Lp, such as less than about 25 percent of a total length Lp. A decal, paint or other structural feature represented by dotted lines 176 may be added to extend the appearance of the roof sensor housing assembly 170 in the vehicle longitudinal direction and/or over bumpers and/or rear of the vehicle. Referring back to FIG. 2, similar sensor housing assemblies 175 and 177 may also be provided over a hood 178 and/or a trunk 180 of the vehicle to visually resemble extended racing stripes.

Figure 7:
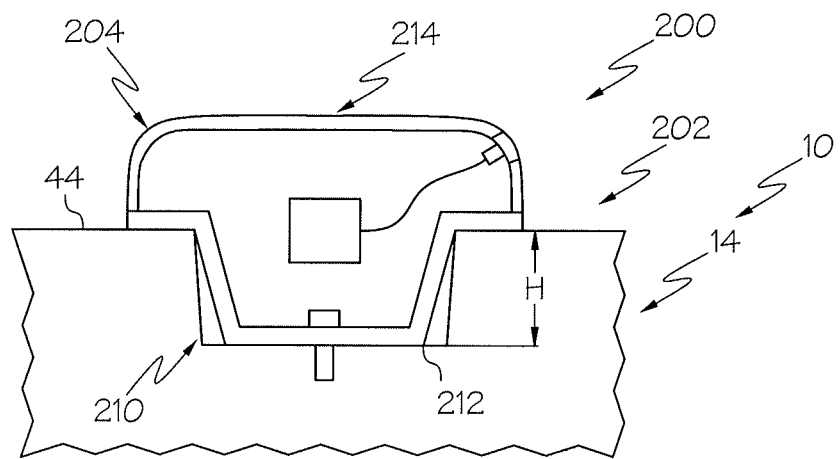
FIG. 7 illustrates a vehicle including another embodiment of a roof sensor housing assembly that conceals a vehicle sensor, according to one or more embodiments shown and described herein.

Referring to FIG. 7, another roof sensor housing assembly 200 includes a bracket mounting structure 202 that is connected to a sensor housing structure 204. The bracket mounting structure 202 may be mounted directly to the outer roof panel 14 using any suitable method including mechanical fasteners, welding, adhesives, etc. In the illustrated embodiment, the bracket mounting structure 202 may be located in a sensor housing recess 210 that extends longitudinally along the length of the outer roof panel 14. The sensor housing recess 210 includes a bracket mounting floor 212 that is located below the outer facing surface 44. In some embodiments, the bracket mounting floor 212 may be located a distance below the outer facing surface 44 of the outer roof panel 14 that is no greater than or substantially equals a height H of the bracket mounting structure 202. Such an arrangement can provide a substantially flush appearance of sensor housing structure 214 with the outer facing surface 44 of the outer roof panel 14 when viewing the exterior of the vehicle 10.

Figure 8:
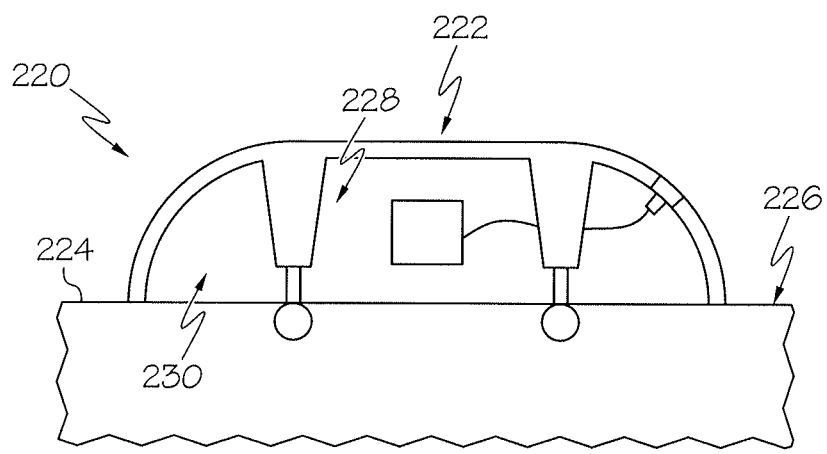
FIG. 8 illustrates a vehicle including another embodiment of a roof sensor housing assembly that conceals a vehicle sensor, according to one or more embodiments shown and described herein.
Figure 9:
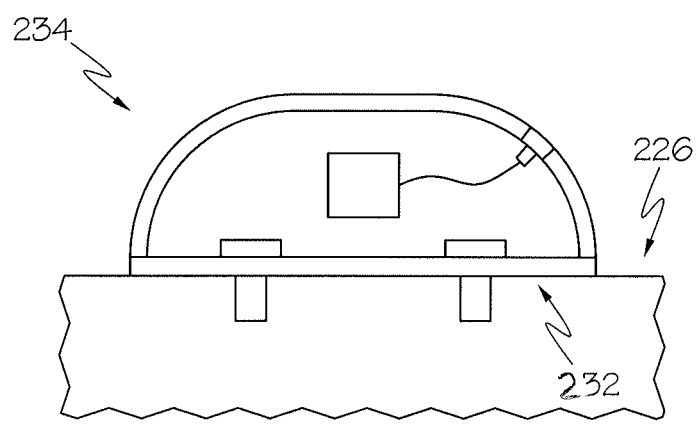
FIG. 9 illustrates a vehicle including another embodiment of a roof sensor housing assembly that conceals a vehicle sensor, according to one or more embodiments shown and described herein.

While embodiments described above illustrate a sensor housing recess formed in the outer roof panel, in some embodiments, sensor housing recess may be provided, as shown by FIGS. 8 and 9. Referring to FIG. 8, a roof housing assembly 220 includes a sensor housing structure 222 that is connected directly to an outer facing surface 224 of outer roof panel 226 using a clip assembly 228. In this embodiment, a sensor housing volume 230 is formed the sensor housing structure 222 and the outer roof panel 226 without a sensor housing recess. FIG. 9 illustrates a similar embodiment that utilizes bracket mounting structure 232 to connect sensor housing structure 234 to the outer roof panel 226.

The above-described roof sensor housing assemblies can provide one or more vehicle sensors to be concealed on a roof assembly of a vehicle. By concealing the one or more sensors within the roof sensor housing assemblies, the vehicle sensors may remain largely hidden from view. Thus, vehicle sensors may be placed inconspicuously along higher points of the vehicle which may improve sensor function while preserving the visual appeal of the vehicle. Further, while relatively widely spaced roof sensor housing assemblies are illustrated by FIG. 5 (e.g., greater than about 10 inches) narrower spaced roof sensor housing assemblies may be provides, such as similar to rally-style racing stripes (e.g., spaced at most about 6 inches, at most about 2 inches, etc.). While sensor housing recesses may be used, other recesses may also be used such as the connecting location recesses of FIG. 3 that can add additional sensor housing volume.

Height, width and length of the sensor housing structure may also be selected to provide the desired visual effect. For example, a maximum height H (FIG. 3) of the sensor housing structure in the vehicle vertical direction may be less than the maximum width Ws of the sensor housing structure in the vehicle lateral direction to provide a low-profile appearance resembling, for example, a racing stripe. The exterior color of the sensor housing structure may also be provided to enhance the visual effect, such as black or other color for resembling a racing stripe. The exterior color of the sensor housing structure may depend on, for example, a color of an exterior of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a roof assembly comprising a roof outer panel having an outer facing surface and a sensor housing recess having a floor portion located below the outer facing surface, the sensor housing recess extending in a vehicle longitudinal direction between a front windshield and a rear windshield;
    a roof sensor housing assembly mounted to the roof outer panel and extending along a length of the sensor housing recess, the roof sensor housing assembly comprising:
        a sensor housing structure mounted to outer roof panel forming a sensor housing volume therebetween, wherein the sensor housing structure extends at least partially above the outer facing surface of the outer roof panel, the sensor housing structure including a transmission region having increased transmittance therethrough compared to surrounding regions of the sensor housing structure; and
        a vehicle sensor located within the sensor housing volume that receives electromagnetic energy through the transmission region and provides a signal that is indicative of an environmental characteristic.

2. The vehicle of claim 1, wherein a length of the roof sensor housing assembly is at least about two times a width of the roof sensor housing assembly.

3. The vehicle of claim 1, wherein a length of the roof sensor housing assembly is at least about five times a width of the roof sensor housing assembly to provide a visual indication of a racing stripe extending along the length of the sensor housing recess.

4. The vehicle of claim 3, wherein the roof housing sensor assembly is a single roof sensor housing assembly that extends through a geometric center of the outer roof panel.

5. The vehicle of claim 3, wherein the roof housing assembly is a first roof sensor housing assembly, the vehicle comprising a second roof sensor housing assembly having a length that is substantially equal to a length of the first roof sensor housing assembly and a width that is substantially equal to the width of the first roof sensor housing assembly.

6. The vehicle of claim 5, wherein the first roof sensor housing assembly and the second roof sensor housing assembly extend substantially parallel to each other.

7. The vehicle of claim 1 further comprising a bracket mounting structure fixedly mounted within the sensor housing recess at a location below the outer facing surface.

8. The vehicle of claim 1, wherein the transmission region is separately formed from the sensor housing structure and is connected thereto.

9. The vehicle of claim 1, wherein the roof housing assembly is a first roof sensor housing assembly, the vehicle comprising another roof sensor housing assembly located on at least one of a hood and a trunk.

10. A roof sensor housing assembly to mount to a roof outer panel of a vehicle, the roof sensor housing assembly comprising:
    a bracket mounting structure that mounts to the roof outer panel having a sensor housing recess with a floor portion located below an outer facing surface of the roof outer panel, the bracket mounting structure mounts to the floor portion;
    a sensor housing structure mounted to the bracket mounting structure forming a sensor housing volume therebetween, wherein the sensor housing structure includes a transmission region having increased transmittance therethrough compared to surrounding regions of the sensor housing structure; and
    a vehicle sensor located within the sensor housing volume that receives electromagnetic energy through the transmission region and provides a signal that is indicative of an environmental characteristic;
    wherein the sensor housing structure has a length that is at least about three times a width of the sensor housing structure to provide a visual indication of a racing stripe.

11. The roof sensor housing assembly of claim 10, wherein a height of the sensor housing structure is no greater than a width of the sensor housing structure.

12. The roof sensor housing assembly of claim 10, wherein the length of the sensor housing structure is at least about five times the width of the sensor housing structure.

13. The roof sensor housing assembly of claim 10, wherein the transmission region is separately formed from the sensor housing structure and is connected thereto.

14. The roof sensor housing assembly of claim 10, wherein the transmission region is integral with the sensor housing structure.

15. A vehicle comprising:
    a roof assembly comprising:
        a roof outer panel having an outer facing surface and a first sensor housing recess having a floor portion located below the outer facing surface, the first sensor housing recess extending in a vehicle longitudinal direction between a front windshield and a rear windshield; and
        the roof panel having a second sensor housing recess that extends having a floor portion located below the outer facing surface, the second sensor housing recess extending in the vehicle longitudinal direction between the front windshield and the rear windshield;
    a first roof sensor housing assembly mounted to the roof outer panel and extending along a length of the first sensor housing recess in an elongated fashion, the first roof sensor housing assembly having a length that is greater than a width of the first roof sensor housing assembly to provide a visual indication of a first racing stripe; and
    a second roof sensor housing assembly mounted to the roof outer panel and extending along a length of the second sensor housing recess in an elongated fashion, the second roof sensor housing assembly having a length that is greater than a width of the second roof sensor housing assembly to provide a visual indication of a second racing stripe.

16. The vehicle of claim 15, wherein each first roof sensor housing assembly and second roof sensor housing assembly includes:
    a bracket mounting structure fixedly mounted within the respective first and second sensor housing recess at a location below the outer facing surface;
    a sensor housing structure mounted to the bracket mounting structure forming a sensor housing volume therebetween, wherein the sensor housing structure extends at least partially above the outer facing surface of the outer roof panel, the sensor housing structure including a transmission region having increased transmittance therethrough compared to surrounding regions of the sensor housing structure.

17. The vehicle of claim 16, wherein a height of the sensor housing structure of each first roof sensor housing assembly and second roof sensor housing assembly is less than a width of each first roof sensor housing assembly and second roof sensor housing assembly.

18. The vehicle of claim 16, wherein each first roof sensor housing assembly and second roof sensor housing assembly includes a vehicle sensor located within the sensor housing volume that receives electromagnetic energy through the transmission region and provides a signal that is indicative of an environmental characteristic.

19. The vehicle of claim 16, wherein the transmission region of each first roof sensor housing assembly and second roof sensor housing assembly is formed separately from the sensor housing structure and connected thereto.

20. The vehicle of claim 15, wherein each first roof sensor housing assembly and second roof sensor housing assembly has a length that is at least about five times a width of the first and second roof sensor housing assemblies.

* * * * *